(No Model.)
R. L. PENN.
GANG PLOW.
No. 478,634.  Patented July 12, 1892.
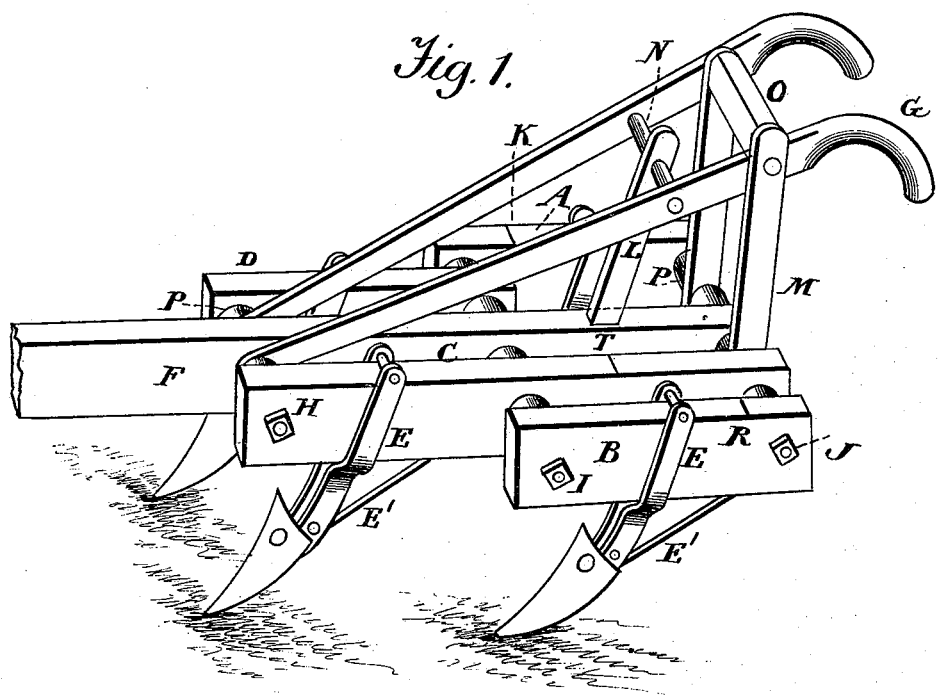
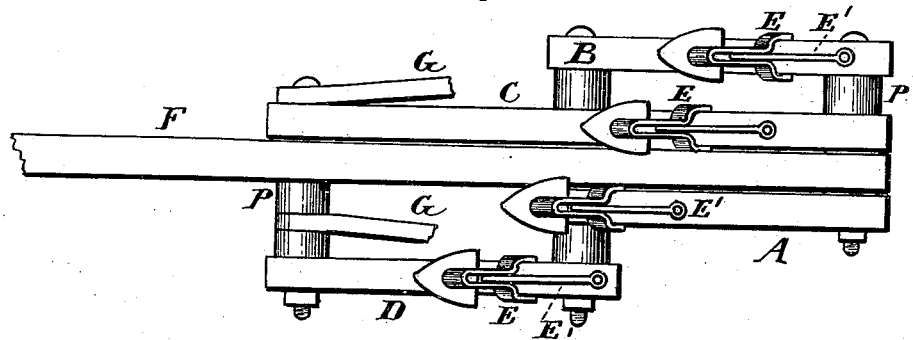
Witnesses.
A. Ruppert,
G. B. Towles
Inventor.
Richard L. Penn,
Per
Thomas P. Simpson,
Atty.

UNITED STATES PATENT OFFICE.

RICHARD L. PENN, OF BASHAM'S GAP, ALABAMA.

GANG-PLOW.

SPECIFICATION forming part of Letters Patent No. 478,634, dated July 12, 1892.

Application filed March 7, 1892. Serial No. 424,025. (No model.)

*To all whom it may concern:*

Be it known that I, RICHARD L. PENN, a citizen of the United States, residing at Basham's Gap, in the county of Morgan and State of Alabama, have invented certain new and useful Improvements in Gang-Plows; and I do hereby declare the following to be a full, clear, and exact description of the invention, such as will enable others skilled in the art to which it appertains to make and use the same.

The special object of the invention is to make a straddle-row-cultivator frame adapted to be used with gangs of turn-plows, shovels, or pulverizers.

The invention consists in making the beams and connecting them together, so that the same frame may be conveniently used for carrying a gang of turn-plows or of ordinary cultivator-teeth.

Figure 1 of the drawings is a perspective view showing the frame with its beams and standards arranged for carrying shovels or cultivator-teeth, and Fig. 2 a bottom plan view showing the same frame arranged to carry turn-plows.

In the drawings, A B C D represent the several beams, upon each of which is arranged an adjustable plow-standard E, braced by a pivoted rod E'.

F is the draft bar, pole, or tongue, and G G the handles; H I J, end threaded coupling-rods which carry nuts; L M, uprights to support the handles and connect the rods with the rounds N O.

As shown in Fig. 1 of the drawings, the frame has its beams and standards arranged for and provided with shovels or cultivator-teeth of any preferred form, the beams being intermediately spaced by tubes or blocks P, which are longer or shorter, according to the distance apart at which the plows or cultivator-teeth are to be placed. In order to adapt this frame to receive a gang of turn-plows, as shown in Fig. 2 of the drawings, the beam D is put on the outside of beam A, the standard on beam D remaining unchanged in its position, while that on beam A is moved up on the beam to the point which is marked T, so that the plow on beam A will turn the soil into the furrow made by the plow on the beam D. The standard on beam C is moved back to the point marked T, so that its plow will throw the soil into the furrow made by the plow on the beam A, while the standard on the beam B is pushed back to the point marked R, so that its plow will throw the soil into the furrow made by the plow on the beam C. Thus it will be seen that in a gang of turn-plows that on beam D is in the front and the others arranged diagonally. Of course they may be arranged so as to form a right or left gang, as may be wished.

Having thus described all that is necessary to a full understanding of my invention, what I claim as new, and desire to protect by Letters Patent, is—

A gang-plow frame consisting of the draft-beam, the long plow-beam C, and the short plow-beams A B D, said beams being connected by bolts with spacers thereon, and said plow-beams carrying adjustable plow-standards and having the beams A B C, marked, respectively, at K R T, as shown and described, whereby said frame may carry a single gang of four turn-plows or two similar gangs of shovel-plows, as shown and described.

In testimony whereof I affix my signature in presence of two witnesses

RICHARD L. PENN.

Witnesses:
JOE L. ROUNTREE,
ALBERT S. BRITNELL.